(12) United States Patent
Dittmar et al.

(10) Patent No.: US 6,499,022 B1
(45) Date of Patent: Dec. 24, 2002

(54) METHOD AND APPARATUS FOR OPTIMIZATION OF SERVO PARAMETER VALUES IN A DATA STORAGE DEVICE

(75) Inventors: Mark Dittmar, Westminster, CO (US); James Alexander, Boulder, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/413,299

(22) Filed: Oct. 6, 1999

Related U.S. Application Data

(63) Continuation-in-part of application No. 09/113,488, filed on Jul. 10, 1998, now Pat. No. 6,144,951, which is a continuation of application No. 08/731,827, filed on Oct. 21, 1996, now Pat. No. 5,781,699.

(51) Int. Cl.[7] .................................................. G06N 3/12
(52) U.S. Cl. ......................... 706/13; 364/157; 364/161; 364/162; 364/165
(58) Field of Search ........................... 706/13; 364/162, 364/161, 157, 165

(56) References Cited

U.S. PATENT DOCUMENTS

| | | | |
|---|---|---|---|
| 5,394,509 A | 2/1995 | Winston | 395/13 |
| 5,400,436 A | 3/1995 | Nara et al. | 395/13 |
| 5,428,709 A | 6/1995 | Banzhaf | 395/13 |
| 5,434,796 A | 7/1995 | Weininger | 364/496 |
| 5,971,579 A | * 10/1999 | Kim | 360/86 |

OTHER PUBLICATIONS

Jong–Hwan Kim; Hong–Kook Chae; Jeong–Yul Jeon; Seen– Woo Lee, Identification and control of systems with friction using accelerated evolutionary programming, IEEE Control Systems Magazine, vol.: 16 Issue: 4, Aug. 1996 pp.: 38–47.*

Jeong–Yul Jeon; Jong–Hwan Kim; Kwangill Koh, Experimental evolutionary programming–based high–precision control, IEEE Control Systems Magazine, vol.: 17 Issue: 2, Apr. 1997, pp. : 66–74.*

Jeong–Yul Jeon; Seon–Woo Lee; Hong–Kook Chae; Jong–Hwan Kim, Low velocity friction identification and compensation using accelerated evolutionary programming, Evolutionary Computation, 1996., Proceedings of IEEE International Conference on, May 20–22, 1996.*

* cited by examiner

Primary Examiner—Wilbert L. Starks, Jr.
(74) Attorney, Agent, or Firm—Tejpal S. Hansra

(57) ABSTRACT

A genetic process is used to tune servo parameter values in a disk drive. An initial population of individuals is generated each including a value for each of a plurality of servo parameters. Fitness values are then calculated for each of the individuals in the initial population. Individuals from the initial population are then chosen for mating based on the calculated fitness values. The chosen individuals are manipulated using genetic operators to produce a new population of individuals. Fitness values are then calculated for the new population and the cycle is repeated. The process is continued until a predetermined criterion has been met. After the process has ended, an individual is chosen based on fitness values and the servo parameters of the disk drive are set accordingly.

30 Claims, 5 Drawing Sheets

| SAMPLE TIME | 0 | 1 | 2 | 3 | 4 | 5 | 6 | 7 |
|---|---|---|---|---|---|---|---|---|
| FEEDFORWARD VALUE | p | 2p | p | 0 | -p | -2p | -p | 0 |
| DISTANCE TO GO | $C_1$ | $C_2$ | $C_3$ | $C_4$ | $C_5$ | $C_6$ | $C_7$ | $C_8$ |

*Fig. 3*

METHOD AND APPARATUS FOR
OPTIMIZATION OF SERVO PARAMETER
VALUES IN A DATA STORAGE DEVICE

This application is a continuation-in-part of U.S. patent application Ser. No. 09/113,488, filed Jul. 10, 1998, which is now U.S. Pat. No. 6,144,951 which is a continuation of U.S. patent application Ser. No. 08/731,827, filed Oct. 21, 1996, which issued Jul. 14, 1998 as U.S. Pat. No. 5,781,699, both of which are hereby incorporated by reference.

FIELD OF THE INVENTION

The present invention relates in general to data storage systems and, more particularly, to the optimization of system parameter values in a data storage system.

BACKGROUND OF THE INVENTION

A disk drive is a data storage device that stores data in concentric tracks on a disk shaped medium. Data is read from the medium by spinning the medium about a central axis while positioning a transducer near a target track of the medium to sense the data. The transducer provides an electrical signal representative of the sensed data to data processing circuitry within the disk drive which converts the electrical signal to a format that is recognizable by an attached host unit. The converted data signal is then delivered to the host unit for use thereby. Disk drives can store data in any of a number of different forms, such as magnetic data storage and optical data storage.

To accurately transfer data to/from the target track, the transducer must first be moved from a present location to the vicinity of the target track and then the transducer must be held relatively steady above the target track. Preferably, the transducer element performing the transfer will be substantially centered above the target track during the data transfer. To position the transducer with respect to the track, a servo positioning system is generally implemented. The servo positioning system uses position feedback information read from the surface of the disk by the transducer and a plurality of servo parameter values to perform the desired servo positioning operations. If the servo parameter values used by the servo positioning system are not adequately tuned, the resulting servo positioning operations will be inaccurate and disk drive performance will be compromised.

In the past, servo parameter values were generated by first developing a mathematical model describing the specific servo system being implemented. The mathematical model was then used to determine theoretical ideal settings for the various servo parameters of the system. The theoretical settings would then be applied to the system and the performance measured. If the resulting performance was not as theoretically predicted, as was often the case, further refinement of the mathematical model and/or manual adjustment of system parameters would be undertaken. As can be appreciated, this process of determining an acceptable set of servo parameter values can be complex and time consuming. Manual adjustment of the servo parameter values is difficult because many of the parameter settings in the servo system are dependant on other parameter settings so that adjustment of one parameter value affects the optimal setting for one or more other parameter values. Because of the inherent complexity of the process, the parameter values resulting from such a process are generally far from optimal. In addition, because of variations in physical characteristics between disk drives, optimal servo parameter values for one disk drive are often sub-optimal in other disk drives having the same design.

Therefore, there is a need for a method and apparatus for rapidly, accurately, and efficiently tuning servo parameter values in a disk drive.

SUMMARY OF THE INVENTION

The present invention relates to a system that is capable of rapidly tuning servo parameter values in a disk drive. The system makes use of a genetic process for adaptively tuning the parameter values based on simulated evolution. The system requires no complex math calculations and is simple enough to be resident on the drive itself. Because of its speed and simplicity, the system can be used to tune servo parameter values in each individual disk drive in a manufacturing operation. Thus, the system is capable of significantly improving average disk drive servo performance in a high volume manufacturing environment. In addition, the system can be implemented within the disk drive itself, thus allowing periodic parameter re-calibrations to be performed in the field.

In one embodiment of the invention, an initial population of individuals is first generated, each individual including a value for each of a plurality of servo parameters. Fitness values are then calculated for each of the individuals in the initial population. Individuals from the initial population are then chosen for mating based on the calculated fitness values. The chosen individuals are manipulated using genetic operators to produce a new population of individuals. Fitness values are then calculated for the new population and the cycle is repeated. The process is continued until a predetermined criterion has been met. After the process has ended, an individual is chosen based on fitness values and the servo parameters of the disk drive are set accordingly.

BRIEF DESCRIPTION OF THE DRAWINGS

FIG. 3 is a graph illustrating a position mode table for an 8 servo sample seek that can be generated in accordance with the present invention;

DETAILED DESCRIPTION

The present invention relates to a system for rapidly tuning servo parameter values in a disk drive, using a genetic process. The genetic process accelerates the ascertainment of servo parameter values for the disk drive that result in a desired level of disk drive servo performance. Because the system works relatively quickly, it can be used to individually tune each of the disk drives assembled during high volume manufacturing operations with minimal delays. The system can be part of a separate manufacturing test stand that determines and stores tuned servo parameter values in disk drives during manufacture or it can be an integral part of each disk drive thus allowing periodic re-calibrations to be performed in the field. The system is capable of significantly enhancing average disk drive servo performance in a high volume production environment.

In a preferred approach, the inventive techniques are used to determine tuned parameter values that are stored within the disk drive for later use during normal disk drive operation to perform specific servo control operations within the disk drive. For example, in one embodiment of the present invention, as described below, the inventive principles are used to develop a plurality of position mode tables for use in performing position mode seek operations in a disk drive. It should be appreciated that the principles of the present invention can also be used to tune other types of servo parameter values in a disk drive and that the discussion that follows is not intended to limit the form or number of parameter values tuned. To facilitate an understanding of the present invention, a brief description of the operation of a typical disk drive and servo control loop that can utilize the principles of the present invention is now presented.

Figure 1:
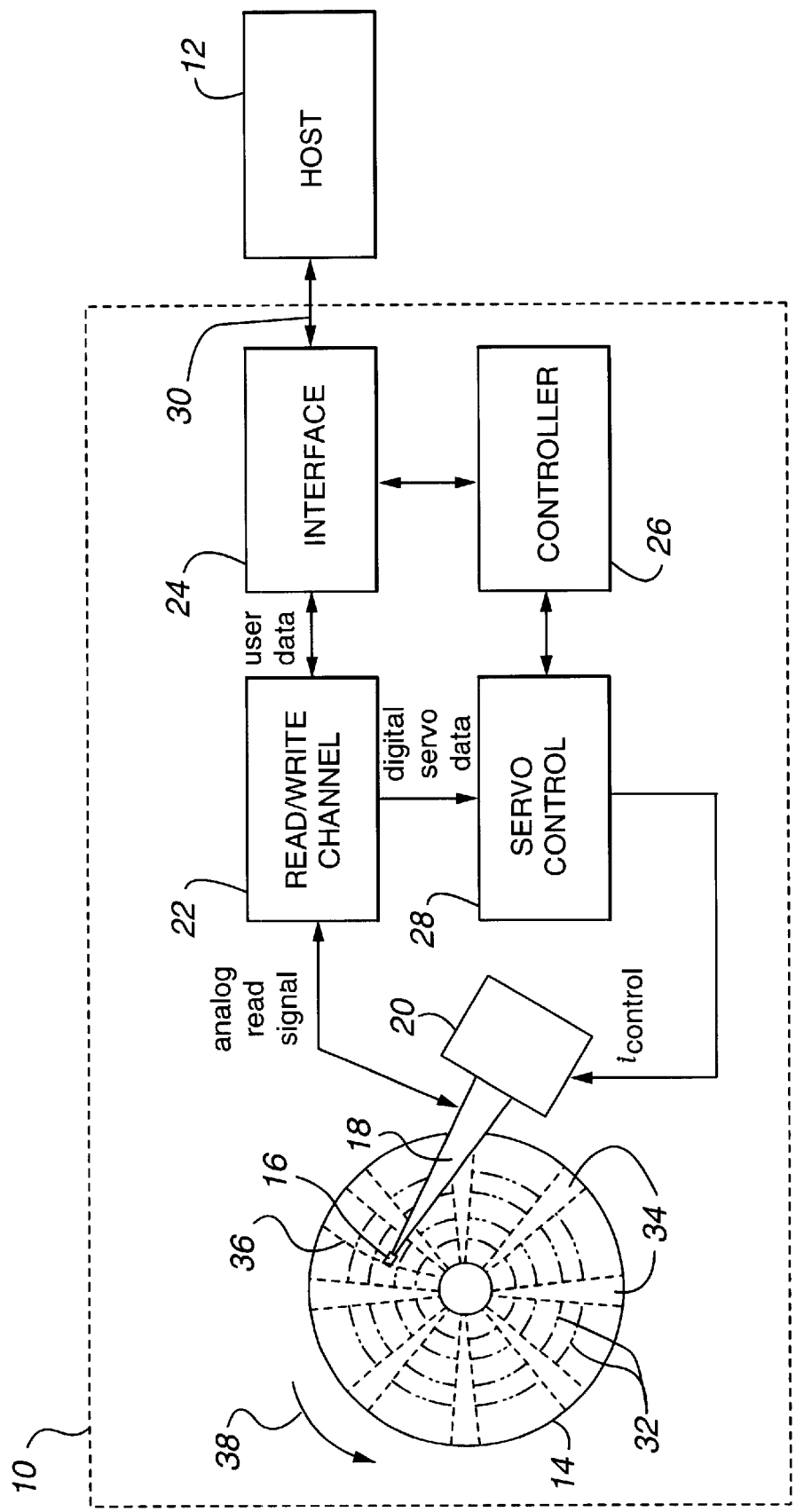
FIG. 1 is a block diagram illustrating a disk drive that can utilize the principles of the present invention.

FIG. 1 is a block diagram illustrating a disk drive 10 that can utilize the principles of the present invention. As illustrated, the disk drive 10 is coupled to an external host computer 12 which uses the disk drive 10 as a mass storage device. The disk drive 10 includes: a data storage disk 14, a transducer 16, an actuator arm 18, a voice coil motor (VCM) 20, a read/write channel 22, an interface 24, a controller 26, and a servo control unit 28. It should be understood that the blocks illustrated in the diagram of FIG. 1, and in the other block diagrams herein, are functional in nature and do not necessarily represent discrete hardware devices. The data storage disk 14 is a disk shaped data storage medium having a magnetic coating disposed upon at least one surface thereof. User data is stored on the magnetic surface of the disk 14 in the form of magnetic polarity transitions. The user data is arranged in a plurality of concentric data storage tracks 32 on the surface of the disk 14. A plurality of radially aligned servo wedges 34 are also provided on the surface of the disk 14 for storing, among other things, servo positioning information. During disk drive operation, a spin motor (not shown) spins the disk 14 about an axis of rotation while data is transferred to (in a write operation) or from (in a read operation) the surface of the disk 14.

The transducer 16 is a magnetic field sensor/radiator that is capable of reading data from and writing data to the surface of the disk 14 when held in close proximity thereto. Some disk drives utilize separate transducer elements to perform the reading and writing functions. The actuator arm 18 is a support structure that carries the transducer 16 above the surface of the disk 14. The actuator arm 18 is coupled to the VCM 20 which is operative for imparting rotational motion to the actuator arm 18 to controllably position the transducer 16 above a target track of the disk 14 during read and write operations. In response to an input signal received from the servo control unit 28, the VCM 20 pivots the actuator arm 18 about a pivot point until the transducer 16 is substantially centered above the target track. As the actuator arm 18 pivots about the pivot point, the transducer 16 travels across the surface of the disk 14 along an arc 36.

During normal operation, the disk drive 10 receives read and/or write requests from the host computer 12 via port 30. Each request is received by the interface 24 which converts the request to an appropriate signal format and forwards the request to the controller 26. The controller 26 then carries out the request by appropriately controlling, among other things, the servo control unit 28 and the interface 24. The request from the host 12 typically specifies the location on the surface of the disk 14 to/from which the requested data transfer is to take place. This location is normally specified as a particular track (i.e., the target track) and sector of the disk 14.

The controller 26 instructs the servo control unit 28 to move the transducer 16 to the target track specified in the read/write request. The servo control unit 28 then generates a control signal, $i_{control}$, which it delivers to the VCM 20 to move the transducer 16 from a present location to the target track. This process of moving the transducer 16 from a present location to the vicinity of the target track is known as a seek operation. When the transducer 16 is sufficiently close to the target track, the controller 26 switches the servo control unit 28 to a settle mode during which the transducer 16 settles about the target track. Once the transducer is sufficiently settled, a track following mode is entered during which the transducer 16 is substantially locked onto the target track. It is during this track following mode that the bulk of the requested data transfer is allowed to take place.

As the disk 14 spins, the transducer 16 is continuously reading the servo information in the servo wedges 34 on the surface of the disk 14. This occurs even as the transducer 16 is moving during a seek operation. Because the servo wedges 34 are spaced at equal angles about the disk 14, servo information is generated by the transducer 16 at substantially equal time intervals. Each of the servo wedges 34 includes position information that allows the disk drive 10 to determine the position of the transducer 16 with respect to the disk 14 at the time the particular servo wedge 34 was read (i.e., the corresponding servo sample time). The read/write channel 22 receives the servo data read by the transducer 16 and converts it to a digital representation. The digital servo data is then delivered to the servo control unit 28 which uses the data to generate the control signal, $i_{control}$. Thus, a closed loop feedback system is maintained for positioning the transducer 16 with respect to the disk 14.

The servo wedges 34 on the surface of the disk 14 include, among other things, both coarse and fine position information for use in determining a radial position of the transducer 16. The coarse position information generally identifies, using a Gray code, the particular track within which the transducer 16 is located at a corresponding servo sample time. The fine position information generally indicates the radial offset from the track centerline of the transducer 16 at the corresponding servo sample time. Fine position information is typically derived from A, B, C, and D servo bursts within the servo wedges 34. The A and B bursts share a common boundary on the track centerline while the C and D bursts share common boundaries at the half-track locations. As is well known in the art, an accurate indication of a transducer's radial offset from the centerline of a track can be determined by observing the pulse amplitudes generated by the transducer 16 as a result of reading the A, B, C, and D servo bursts.

Figure 2:
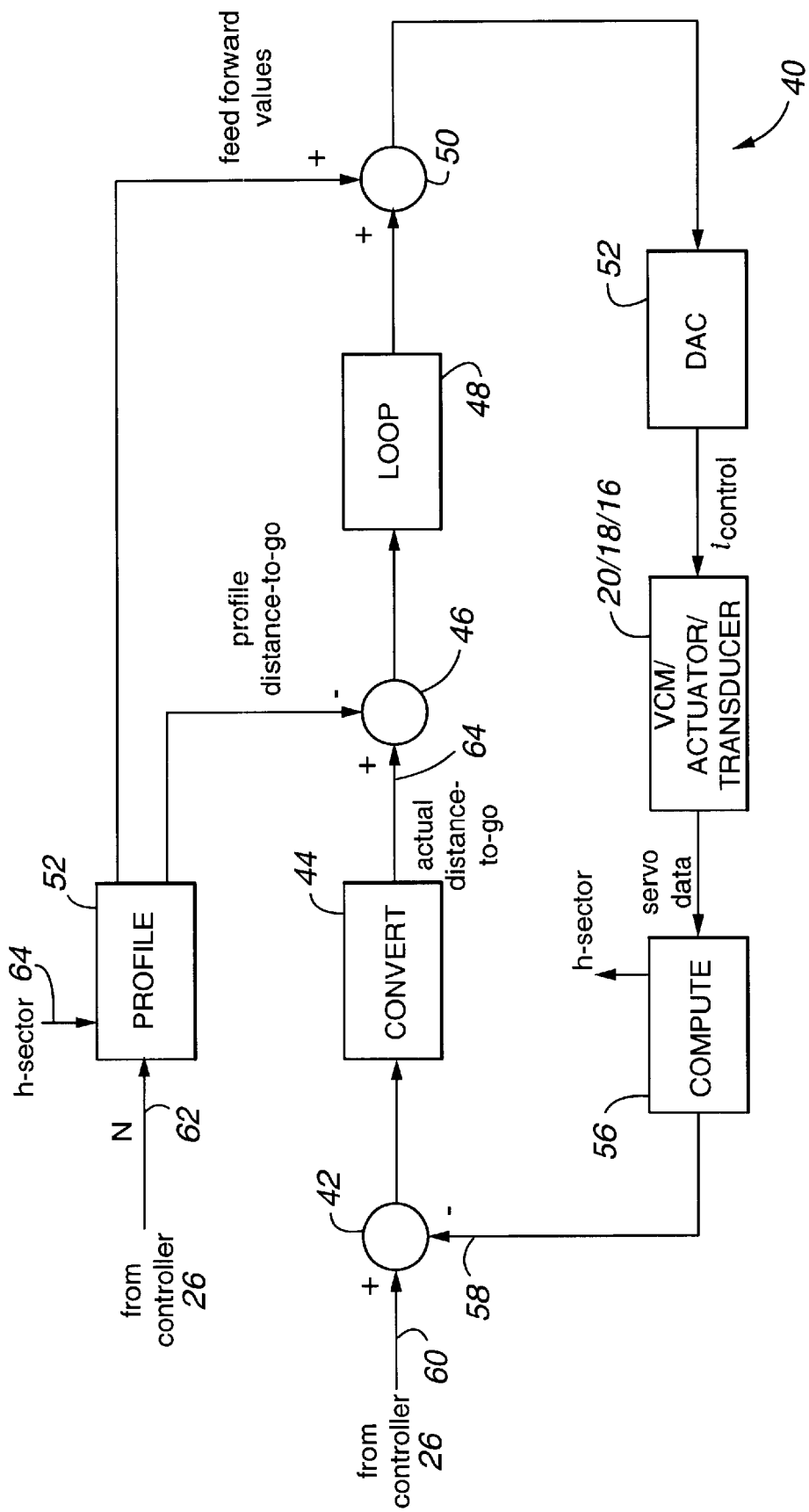
FIG. 2 is a block diagram illustrating a servo control loop used in the disk drive of FIG. 1.

FIG. 2 is a simplified block diagram illustrating a servo control loop 40 that can be used to generate the control signal $i_{control}$ that is delivered to the VCM 20 during a seek operation. The servo control loop 40 of FIG. 2 is operative for performing position mode (PM) seek operations and, therefore, is preferably used during short seek operations in the disk drive 10. Short seek operations are any seeks involving movement of less than a predetermined number of tracks (e.g., 128 tracks). Although the invention will be described in connection with the servo control loop of FIG. 2, it should be appreciated that the principles of the present invention can be used to tune parameter values in virtually any form of disk drive servo control system including, for example, velocity-based seek control loops and track following loops. In addition, the inventive principles can also be used to tune servo parameters in servo systems outside the disk drive area.

As illustrated in FIG. 2, the servo control loop 40 includes: a first difference unit 42, a conversion unit 44, a second difference unit 46, a loop unit 48, a summation unit 50, a digital-to-analog converter (DAC) 52, a VCM/actuator/transducer 20/18/16, a position computation unit 56, and a profile unit 52. In a preferred embodiment, the majority of the functionality within the servo control loop 40 of FIG. 2 is implemented within the servo control unit 28 of FIG. 1. As described above, the servo control loop 40 is operative for generating the control signal that is delivered to the VCM 20 during a seek operation. To do this, the servo control loop 40 generates a position-based profile describing how the transducer 16 should move during a particular seek operation and then monitors the position of the transducer 16 during the seek operation to ensure that the profile is being followed. If the profile is not being closely followed, corrections are made within the loop 40 to compensate for the errors.

The seek profile is generated within the profile unit 52. The profile unit 52 has access to a plurality of position mode tables from which the seek profiles are developed. The position mode tables can be stored, for example, within a non-volatile semiconductor memory within the disk drive 10. Each of the position mode tables corresponds to a specific number of servo samples that are required to perform an associated seek operation. For example, one position mode table is used to perform an eight servo sample seek, another is used to perform a nine servo sample seek, and so on. The number of servo samples required to perform a seek depends upon the length of the seek (i.e., the number of tracks between the initial position of the transducer and the target track). Thus, if the seek operation has a length from 10 to 20 tracks, for example, 10 servo samples may be required and a first position mode table is used; if the seek operation has a length from 21 to 30 tracks, 11 servo samples may be required and a second position mode table is used; etc.

The controller 26 indicates the number of tracks in the present seek operation, N, to the profile unit 52 via input 62. The profile unit 52 then selects a position mode table based on the value of N and uses the selected position mode table to generate the seek profile. Each position mode table includes a plurality of servo parameter values that are used to facilitate performance of an associated seek operation. For example, the position mode tables can each indicate: (a) a desired distance-to-go value for each servo sample time during the seek operation, and (b) at least one feedforward value that will be used for each servo sample time during the seek operation to control the acceleration/deceleration of the transducer 16.

FIG. 3 illustrates a possible position mode table for an 8 servo sample seek. The distance-to-go parameter values, $C_1$, $C_2$, . . . , $C_8$, represent the desired distance between the transducer 16 and the target track at each of the 8 servo sample times during the seek operation. Typically, both the feedforward values and the distance-to-go values in each position mode table are normalized to a single track and, therefore, must be multiplied by the number of tracks in the present seek operation to generate the seek profile. During the seek operation, the profile unit 52 receives an h-sector pulse for each servo sample time. In response, the profile unit 52 outputs a distance-to-go value from the seek profile corresponding to that servo sample time to the second difference unit 46. In addition, the profile unit 52 outputs the feedforward value corresponding to that servo sample time to the summation unit 50.

Prior to moving the transducer 16, the controller 26 delivers position information to the first difference unit 42, via input 60, that identifies the location of the target track.

As described previously, the transducer 16 is continuously reading servo information from the disk 14 including both a coarse indication of present transducer location and a fine indication of present transducer location. This servo information is delivered to the computation unit 56 which, for each servo sample, combines the coarse and fine servo data to form an absolute position indication for the transducer 16 with respect to the disk 14. The computation unit 56 requires a finite amount of time, known as the computation delay, to calculate the absolute position indication. After computation is complete, the computation unit 56 delivers the absolute position indication to the first difference unit 42 and outputs an h-sector pulse to the profile unit 52 indicating that a servo sample has occurred.

The first difference unit 42 subtracts the absolute position indication of the transducer 16 from the position of the target track to determine an actual distance-to-go value which is transferred to the conversion unit 44. The conversion unit 44 converts the actual distance-to-go value to a digital format compatible with the distance-to-go information in the seek profile generated by the profile unit 52. The converted actual distance-to-go value for the present servo sample is then delivered to input 64 of the second difference unit 46. The second difference unit 46 subtracts the actual distance-to-go value from the desired distance-to-go value to form a distance-to-go error value, which it outputs to the loop unit 48. The distance-to-go error value indicates how far the transducer 16 is from the desired profile position at the corresponding sample time and is preferably small. This value is used to compensate for the error by modifying the input signal to the VCM 20.

The loop unit 48 converts the distance-to-go error value to a digital data format compatible with the feedforward values in the seek profile of the profile unit 52 and also provides loop stability. The summation unit 50 adds the feedforward value for the most recent servo sample to the converted distance-to-go error value to produce a digital control value that is delivered to the DAC 52. The DAC 52 converts the digital control value to an analog control current which is delivered to the input of the VCM 20 to control the movement of the transducer 16 in accordance with the profile.

As can be appreciated, the accuracy of the parameter values within the position mode tables will determine how closely the transducer 16 will follow the seek profile during each seek operation. That is, if the parameter values in the tables are poorly tuned, relatively large position errors can exist at the end of the seek profile period, thus delaying the requested transfer of data between the transducer 16 and the disk 14. In conceiving of the present invention, it was determined that the parameter values in the position mode tables could be rapidly tuned using a genetic algorithm approach. That is, a genetic process can be used to find servo parameter values that result in enhanced servo performance in a fraction of the time normally required to determine such values.

Figure 4:
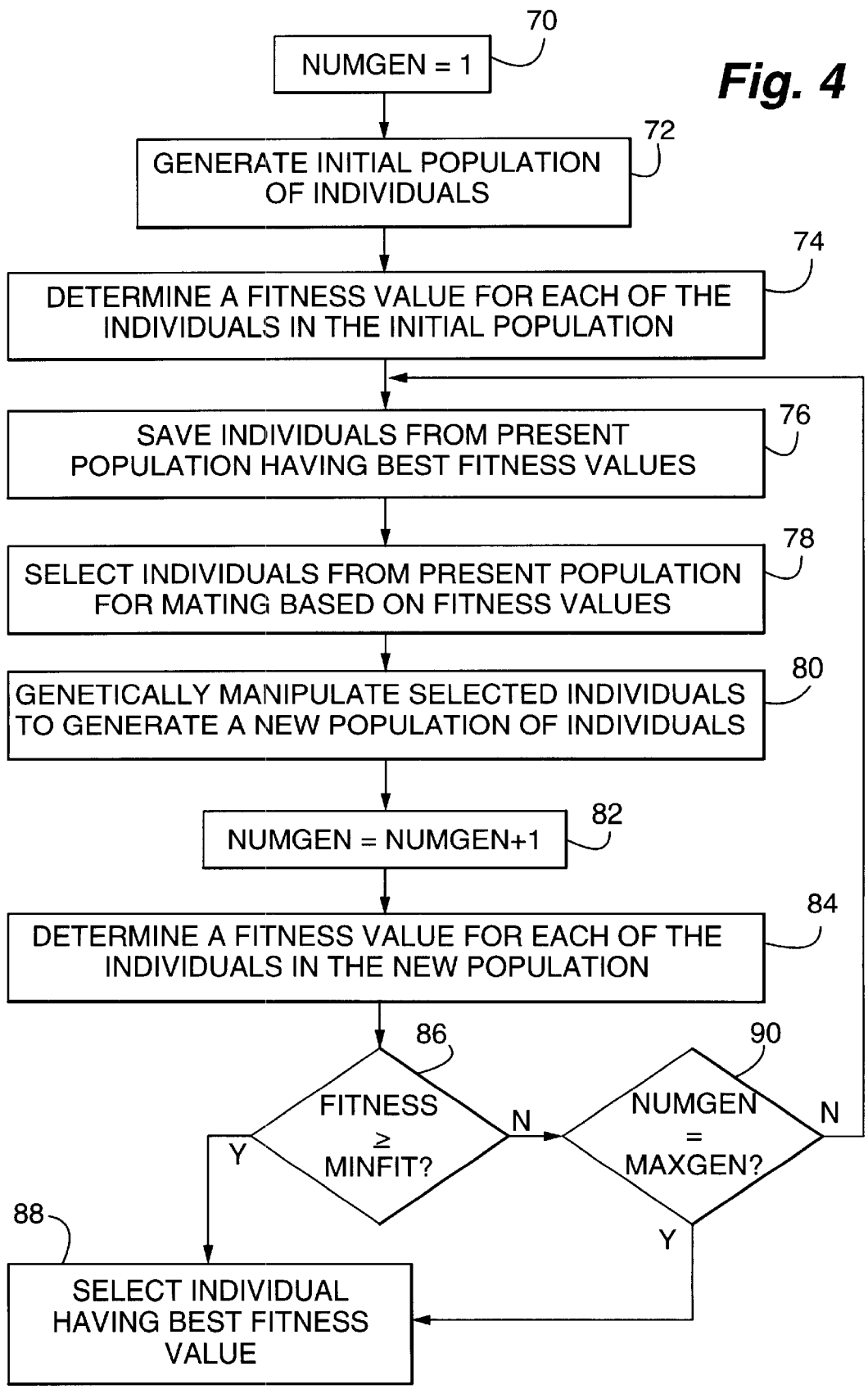
FIG. 4 is a flowchart illustrating a tuning procedure in accordance with one embodiment of the present invention.

FIG. 4 is a flowchart illustrating a method for tuning servo parameters in one embodiment of the present invention. The method can be used, for example, to generate a position mode table for a seek operation having a predetermined number of servo sample times. First, a variable NUMGEN is initialized to a value of 1 (step 70). The NUMGEN variable is operative for tracking the number of population generations that have occurred during the tuning process. Next, an initial population of "individuals" is generated (step 72). Each "individual" consists of a different combination of values for the servo parameters being tuned. A fitness value is then determined for each of the individuals in the initial population to indicate the "fitness" of the individual with respect to the particular servo system being tuned (step 74). To determine a fitness value, the servo parameter values of the individual are used to perform a servo operation in the disk drive (e.g., a seek operation) and a resulting servo performance characteristic of the disk drive is measured. The value of the performance characteristic is then used as the fitness value or is used to calculate the fitness value.

After fitness values have been determined for all of the individuals in the initial population, the individuals having the best fitness values are saved, along with the corresponding fitness values, in a memory (step 76). In one embodiment, for example, three individuals from the initial population are saved. Individuals are then selected from the initial population for use in generating the next population (i.e., for reproduction) (step 78). Preferably, individuals having higher fitness values will have a greater chance of being selected for reproduction than will individuals having lower fitness values. Once individuals have been selected for reproduction, the selected individuals are operated upon by one or more genetic operators to generate the new population of individuals (step 80).

After the new population of individuals has been generated, the NUMGEN variable in incremented by 1 (step 82). Fitness values are then determined for each of the individuals in the new population (step 84). The resulting fitness values are then compared to a minimum desired fitness value MINFIT to determine whether any of the individuals in the new population possess a minimum level of fitness (step 86). If one or more of the individuals in the new population have a fitness level equal to or exceeding the minimum fitness level, an individual having a maximum fitness level is chosen (step 88) from the individuals in the current population and those stored in the memory. The servo parameter values associated with the chosen individual are then stored within the disk drive for later use. For example, in a position mode seek application, the servo parameter values in the chosen individual are used to generate a position mode table for use in the disk drive.

If none of the individuals in the initial population have the desired fitness, it is next determined whether a maximum number of generations (i.e., MAXGEN) have occurred (step 90). If the maximum number of generations have occurred, an individual having a best fitness value is chosen (step 88) from the individuals in the current population and those stored in the memory and the servo parameter values associated with the chosen individual are stored within the disk drive for later use. If the maximum number of generations have not occurred, the method returns to step 76 and the individuals having the best fitness values from the present population are saved. In one approach, a new individual is saved in the memory only if the corresponding fitness value exceeds that of one of the individuals previously saved in the memory. In such a case, the new individual replaces the individual having the lower fitness value. Alternatively, a predetermined number of individuals are stored for each generation.

Individuals are next selected for reproduction from the present population (step 78) and the selected individuals are genetically manipulated to generate a new population (step 80). The NUMGEN variable is incremented (step 82) and fitness values are determined for the new population (step 84). These fitness values are then compared to the MINFIT value (step 86) and if the minimum fitness level has not been achieved it is then determined whether the maximum number of generations have occurred (step 90). The above process is repeated until an individual having the requisite level of fitness is found or a maximum number of generations have been produced.

In a preferred embodiment of the present invention, each individual comprises a data bit string (i.e., a chromosome) having a digital value (i.e., a gene) for each of a plurality of servo parameters to be tuned. The servo parameters can include any parameter having a variable value that effects the servo performance of the disk drive. In one embodiment of the present invention, for example, the servo parameters represented within the chromosome are the feedforward values and the position-to-go values that are used during a position mode seek operation. These values can be tuned in accordance with the invention to generate the position mode tables used by a particular disk drive. In such an embodiment, each of the individuals will preferably include a string of digital data bits having values for each of the feedforward parameters and each of the position-to-go parameters required to perform the seek operation. A separate tuning procedure would have to be performed for each of the required position mode tables (i.e., one procedure for an 8 servo sample seek, another procedure for a 9 servo sample seek, etc.). The number of data bits allotted to each of the feedforward values and each of the position-to-go values will depend upon the required resolution for these parameters.

Figure 5:
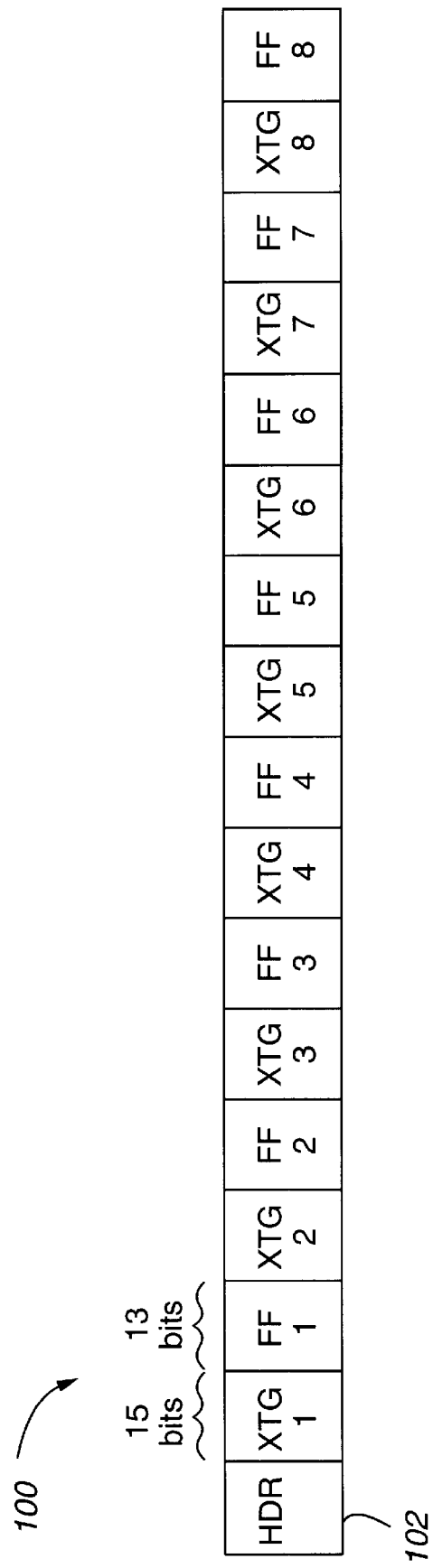
FIG. 5 is a diagram illustrating a "chromosome" structure that is utilized in one embodiment of the present invention.

FIG. 5 illustrates a chromosome 100 that may be used during a process of tuning servo parameters for an 8 servo sample seek operation in accordance with the present invention. As illustrated, the chromosome 100 includes a plurality of position-to-go values XTG1–XTG8 and a plurality of feedforward values FF1–FF8. The chromosome 100 also includes a header portion 102 carrying, among other things, chromosome identification information. Each of the position-to-go values in the chromosome 100 includes 15 binary bits and is therefore capable of specifying up to 32,768 individual position-to-go levels. Similarly, each of the feedforward values includes 13 bits and is thus capable of specifying up to 8,192 individual feedforward levels. In practice, the number of bits used for each of the values will be a matter of design choice and will depend upon the level of resolution required. For purposes of convenience, mapping may be used so that the actual binary values stored within each portion of the chromosome 100 are different from the servo parameter values they represent. If mapping is used, the values in the chromosome 100 have to be decoded before being injected into the servo control loop 40 (see FIG. 2). In an alternative position mode tuning approach, only the feedforward values associated with the position mode seeks are tuned and the individuals, therefore, do not include position-to-go values.

The initial population of individuals can be generated in a number of different ways. In a preferred approach, a prototypal individual is first determined based on knowledge of the system design. Other individuals in the initial population are then generated by randomly varying the gene values in the prototypal individual within selected value ranges. The prototypal individual can be determined, for example, based upon a model of the servo system being tuned. Unlike the relatively complex models used in the past to determine servo parameter values, however, the model used to determine the gene values of the prototypal individual can be relatively simple (i.e., rough) in nature. This is because the tuning process is more efficiently performed by the genetic process than by developing a complex, detailed model. In another approach, the prototypal individual is developed using average tuned gene values from a large number of servo systems having the same design. For example, in a high volume manufacturing environment, running averages can be maintained for servo parameter values in all of the manufactured drives. These running averages can then be used to develop prototypal individuals for later disk drives. Alternatively, sample lots can be tested to develop average values for use in developing prototypal individuals.

As described above, after a prototypal individual has been developed, other individuals in the initial population can then be determined by randomly varying the gene values in the prototypal individual within predetermined ranges. The predetermined ranges can be based upon predicted optimal ranges for the particular parameters being optimized. Alternatively, ranges can be developed based upon historical averages, as described above. In addition, different ranges can be used for different individuals in the initial population. For example, it may be determined that three individuals in the initial population will have gene values that are randomly generated within a 5 percent range of the prototypal value for a particular parameter while four other individuals within the initial population will have gene values that are randomly generated within a 7 percent range of the prototypal value for that parameter.

In another approach to generating the initial population, the gene values in each of the individuals are all randomly generated within corresponding ranges without the generation of a prototypal individual. As before, the ranges can be developed based upon, for example, a system model or historical averages. As described above, after the initial population has been developed, fitness values are determined for each of the individuals in the initial population (step 74). A fitness value is found by performing a servo operation using the servo parameter values of a particular individual and then measuring one or more resulting servo performance characteristics. The fitness value is then calculated using the measured performance characteristic(s). In a seek servo system, for example, a fitness value is determined for an individual by performing a seek operation using the servo parameter values (e.g., the feedforward values and position-to-go values) of the individual. For each individual in the initial population, the transducer 16 is first moved to a predetermined track, the corresponding servo parameters values are decoded (if necessary) and loaded into an appropriate register, and the seek operation is initiated. Then, at the end of the profile period (i.e., at the end of the period of time the seek operation would take if the profile was perfectly followed), one or more servo performance characteristic are measured. The measured characteristic(s) is (are) then used to determine the fitness value. In one embodiment of the invention, for example, the transducer position error signal (PES) at the end of the profile period is used as a fitness value. In another embodiment, a weighted combination of the PES and the transducer velocity error at the end of the profile period is used as a fitness value. Other combinations are also possible. As can be appreciated, when an error value is used as a measure of fitness, the optimal fitness value will be a minimum value.

In another approach, transducer position and/or velocity errors at intermediate points during the seek operation are used in addition to the values at the end of the seek profile period to calculate the fitness value. For example, a weighted combination of the PES value at the end of the profile period and the distance-to-go error values measured at the servo sample times during the profile period can be used as an indication of fitness. In such a case, the PES value at the end of the profile period can be given a greater weight than the distance-to-go error values at the earlier servo sample times. By using such a technique, individuals that closely follow the desired seek profile will be preferred over (i.e., will be deemed more fit than) individuals having the same position error at the end of the profile period but producing large position-to-go errors during the seek operation.

In one embodiment of the invention, multiple seek operations are performed for each of the individuals in the initial population and a fitness value is determined based upon a combination of the resulting performance measurements. For example, the fitness values can be calculated based on a weighted combination of the average PES of the multiple measurements, the standard deviation of the multiple PES measurements, and the slope of the PES curve. The weight given to the average PES is preferably greater than the weight given to the other elements. The weight given to the PES slope is generally chosen to move the optimization process away from steep slopes. The weight given to the PES standard deviation is chosen to minimize the standard deviation.

In step 78, as described above, individuals from the present population are chosen for reproduction based upon the calculated fitness values. The chosen individuals represent the "parents" that will be operated upon to create a new generation of individuals. In one embodiment of the present invention, only the individuals having the best fitness values are selected for mating. In a more complex approach, the probability that a particular individual will be chosen for mating is made proportional to the fitness value of the individual (i.e., survival of the fittest). In this embodiment, a "roulette wheel" selection process can be utilized wherein the bins of the roulette wheel are proportional in length to the fitness of a corresponding individual. To implement the roulette wheel, the following steps are followed. First, calculate the sum of the fitness values for all of the individuals in the present population. Then, assign a unique range of values to each of the individuals in the present population, wherein each range occurs in the interval between one and the calculated sum and has a length equal to the fitness value for the corresponding individual. Next, generate a plurality of random numbers between one and the calculated sum, wherein the number of random numbers in the plurality is equal to the number of individuals that are to be selected for mating purposes. Then, select a separate individual for mating purposes based on the range in which each of the random numbers falls, i.e., if a random number falls in a range corresponding to a particular individual, then that individual is chosen for mating purposes. Using the above procedure, a single individual may be chosen for mating more than once and may be chosen to mate with itself.

As described above, once individuals have been selected for mating, the selected individuals are operated upon using genetic operators to generate a new population of individuals (step 80). Any of a plurality of different genetic operations can be used to manipulate the selected individuals. Some of the genetic operations are used to combine multiple individuals with one another while others operate upon a single individual at a time. One operation that is used to combine individuals is known as "crossover". A crossover operation comprises swapping a portion of a first selected individual with a corresponding portion of a second selected individual. The portions of the individuals that are swapped may be chosen randomly. For example, in one embodiment of the present invention, a random number is generated between one and the length of a chromosome. The crossover point is then chosen after the bit position corresponding to the random number. The portions before the crossover point in each of the selected individuals are then swapped to create a pair of new individuals or offspring. A crossover point may be randomly generated before each crossover operation in the tuning process or a single crossover point can be initially generated and used repeatedly during the tuning process. Alternatively, a particular crossover point may be found empirically to produce enhanced convergence times in the tuning of the servo parameters in a particular disk drive design and hence be used exclusively in the tuning of these drives.

Mutation is a genetic operation that operates upon a single individual. A mutation operation generally comprises the toggling of one or more of the bits in a single individual. In one embodiment of the present invention, mutation is performed on a bit by bit basis on each of the selected individuals. That is, a random number is generated for each of the bits in a particular individual. If the random number falls within a first range, the corresponding bit is toggled. If the random number falls within a second range, the corresponding bit is not changed.

The probability that a particular bit will be toggled is set by adjusting the size of the first and second ranges. For example, if the random number is limited to the region between 0 and 1, then the first range can be from zero to 0.05 and the second range can be from 0.05 to 1. This results in a one in twenty chance that a particular bit will be toggled (i.e., mutated). If, after the genetic operations have been performed, two of the members of the new population are identical, then mutation can again be performed on one of the two individuals until the individual is a unique member of the new population.

It should be appreciated that genetic operations other than those described above, such as dominance and genetic edge recombination, may be performed in accordance with the present invention. In fact, any form of data manipulation that potentially steers the system toward an optimal solution set can be used as a genetic operator. It should also be appreciated that the genetic operations that are used in a particular implementation of the present invention can be performed in any order on the selected individuals. In a preferred embodiment, however, crossover is performed before mutation.

In one embodiment of the invention, a plurality of probability variables are defined that each indicate the probability that a specific genetic operation will be performed during the tuning process. The values of these variables are adjusted to enhance tuning convergence times. The probability variable values can be stored within the disk drive or test stand or the system can prompt a user for the variable values during the tuning process. In one approach, for example, MUTPROB and COPROB variables are stored in a nonvolatile memory in a disk drive. The MUTPROB variable specifies the probability that a mutation operation will be performed on a particular bit within an individual. The MUTPROB variable can thus be used by the system to determine the probability ranges described above with respect to the mutation operation. The COPROB variable specifies the probability that a crossover operation will be performed during the tuning process. That is, after a mating pair has been selected, the probability that crossover will be performed on the pair is controlled by the value of the COPROB variable.

As described above, after the new population of individuals has been generated, fitness values are determined for each of the new individuals (step 84). The fitness values are preferably determined in the same manner used to determine fitness values for the initial population. The new fitness values are then compared to a minimum fitness value, MINFIT. The MINFIT value represents a fitness value that is hoped to be achieved during the tuning process and is not necessarily a value that will provide minimal acceptable results in the disk drive. If the MINFIT value is achieved by at least one individual during a current generation, the individual having the best fitness value is selected (step 86) and the corresponding servo parameter values are stored within the disk drive. If the minimum fitness value is not achieved during the current generation and the maximum number of generations MAXGEN has not been reached, a new population is generated and the cycle repeats.

As can be appreciated, the values of the MINFIT and MAXGEN variables can be adjusted to achieve a particular tuning goal. For example, if an optimal fitness level is desired, the value of MINFIT can be set close to a known optimum fitness level. Accordingly, the MAXGEN variable can be set to a relatively high value to allow the genetic process adequate time to converge. If manufacturing delays are of concern, the MAXGEN number can be reduced to a value that is known to produce acceptable fitness values but does not take an extensive amount of time. If further reductions in manufacturing delay are desired, a reduced MINFIT value can be specified so that the tuning procedure will be terminated as soon as an acceptable fitness is achieved. In an alternative approach, the MINFIT comparison (step 86) is performed only after a predetermined minimum number of generations MINGEN have occurred. This technique ensures that a minimal amount of tuning has been performed before an individual is chosen for use in the disk drive.

As discussed above, in the past, position mode tables were generally provided based solely on the number of servo samples required to perform a requested seek operation. Using such an approach, the same position mode table is used to perform an eight track seek near the inner diameter of the disk that is used to perform an eight track seek near the outer diameter of the disk. In conceiving of the present invention, it was appreciated that optimal servo parameter values can vary as the transducer moves across the surface of the disk. Therefore, in accordance with one aspect of the present invention, position mode tables are supplied as a function of radial disk position as well as a function of the number of required servo samples to perform the seek. For example, in one embodiment, a different position mode table is provided for each consecutive group of a predetermined number of adjacent tracks across the disk surface (e.g., a different table for each 100 tracks). Similarly, in a zoned servo system, a different position mode table can be provided for each of the separate zones on the disk surface. To implement such a system, independent tuning procedures are performed in each of the defined radial disk regions for each position mode table. Because of the rapid nature of the genetic tuning process of the present invention, the determination of additional position mode tables in this manner can be accomplished with little delay in the manufacturing process.

When using position mode tables that vary with radial disk position, the position mode table that is used for a particular seek operation will naturally depend upon the disk location where the seek will occur. The position mode table that will be used can be determined in a number of different ways. In one approach, for example, the table corresponding to the target track is always used. In another approach, the table corresponding to the initial track is always used. In still another approach, the table corresponding to the radial region where the majority of the seek operation will take place is used.

The system of the present invention can be implemented on a test stand for use solely during disk drive manufacture or it can be included within the disk drive itself. If implemented within a test stand, the system will be operative for determining tuned servo parameter values for each tested disk drive and for storing the values within the drive. If the system is implemented within the disk drive, it will also be capable of performing periodic servo system re-calibrations in the field. In one embodiment of the invention, a disk drive is provided that periodically measures servo performance characteristics within the drive to determine whether a re-calibration is necessary. If, for example, an average positioning error exceeds a predetermined threshold value, a servo re-calibration is initiated.

As described above, the principles of the present invention can be used to determine tuned values for a variety of different servo parameter types. For example, servo parameters that are used within a velocity-based seek servo loop can be tuned in accordance with the invention. Such parameters can include, for example, deceleration level(s), loop gain, etc., to optimize settling. Similarly, track following servo parameters, such as loop gain, pole-zero placement to optimize gain margin/phase margin, etc., can be tuned in accordance with the present invention.

Although the present invention has been described in conjunction with a preferred embodiment, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for tuning servo parameter values in a disk drive using a genetic process, said method comprising the steps of:

generating an initial set of parameter value groups, each of said parameter value groups in said initial set of parameter value groups including a value for each of a plurality of servo parameters;

first determining a servo performance quantity for each of said initial set of parameter value groups by performing a servo operation using servo parameter values associated with each group, wherein said step of first determining includes combining two measured servo performance values in a weighted combination;

generating a second set of parameter value groups using said initial set of parameter value groups and servo performance quantities corresponding to said initial set of parameter value groups, each of said parameter value groups in said second set of parameter value groups including a value for each of said plurality of servo parameters;

second determining a servo performance quantity for each of said second set of parameter value groups by performing a servo operation using servo parameter values associated with each corresponding group; and selecting a parameter value group having a best servo performance quantity.

2. The method, as claimed in claim 1, wherein:

said step of generating a second set of parameter value groups includes selecting at least one parameter value group from said first set of parameter value groups for genetic manipulation.

3. The method, as claimed in claim 2, wherein:

said at least one parameter value group is selected based on a servo performance quantity associated with said at least one parameter value group.

4. The method, as claimed in claim 2, wherein:

said step of generating a second set of parameter value groups includes performing at least one genetic operation using said at least one parameter value group.

5. The method, as claimed in claim 4, wherein:

said at least one genetic operation includes one or more of the following: a crossover operation, a mutation operation, a dominance operation, and a genetic edge recombination operation.

6. The method, as claimed in claim 1, wherein:

said step of generating an initial set of parameter value groups includes defining value ranges for each of said plurality of servo parameters.

7. The method, as claimed in claim 6, wherein:

said step of generating an initial set of parameter value groups includes randomly generating servo parameter values within said defined value ranges.

8. The method, as claimed in claim 1, wherein:

said step of first determining includes measuring a transducer position error.

9. The method, as claimed in claim 1, wherein:

said step of first determining includes measuring a transducer velocity error.

10. A method for use in tuning servo parameter values in a disk drive, comprising:

providing a servo control system having a plurality of variable parameters, said servo control system having a multitude of possible parameter value combinations for performing a seek operation in the disk drive, each of said parameter value combinations including one parameter value for each of said plurality of variable parameters;

selecting a subset of said multitude of possible parameter value combinations as an initial population of parameter value combinations;

determining a fitness value for each of said parameter value combinations in said initial population by performing a seek operation in the disk drive, said fitness value indicating an ability of a parameter value combination to accurately perform said predetermined servo operation;

choosing at least one of said parameter value combinations in said initial population for reproduction based on fitness value;

genetically manipulating said at least one parameter value combination to generate a new population of parameter value combinations; and determining a fitness value for each of said parameter value combinations in said new population.

11. The method, as claimed in claim 10, further comprising:

choosing a parameter value combination having a best fitness value when at least one of said parameter value combinations in said new population meets a predetermined fitness criterion.

12. The method, as claimed in claim 10, further comprising:

second choosing at least one parameter value combination from a present population of parameter value combinations for reproduction based on fitness value;

second genetically manipulating said at least one parameter value combination chosen in said second choosing step to generate a subsequent population of parameter value combinations;

second determining a fitness value for each of said parameter value combinations in said subsequent population; and repeating said steps of second choosing, second genetically manipulating, and second determining until a predetermined criterion is satisfied.

13. The method, as claimed in claim 12, wherein:
said predetermined criterion includes generation of a predetermined number of populations.

14. The method, as claimed in claim 12, wherein:
said predetermined criterion includes at least one of said parameter value combinations meeting a predetermined fitness criterion.

15. The method, as claimed in claim 10, wherein:
said step of determining a fitness value for each of said parameter value combinations in said initial population includes performing said predetermined servo operation using servo parameter values associated with a first parameter value combination and measuring at least one resulting servo performance characteristic.

16. A disk drive comprising:
a data storage disk having a plurality of substantially concentric tracks and a plurality of servo sectors within each track;
a spin motor for rotating said data storage disk about an axis;
a transducer for use in transferring data between a track of said data storage disk and an exterior environment;
an actuator arm assembly coupled to said transducer for use in moving said transducer to a desired track of said data storage disk to perform a data transfer with the desired track, said actuator arm assembly including an actuator arm for supporting said transducer and a motor unit for controllably moving said actuator arm in response to a control signal applied to said motor unit;
a servo control unit coupled to said motor unit for use in generating said control signal, said servo control unit having a plurality of variable parameters that affect the generation of said control signal and thus impact servo performance in said disk drive; and
a servo parameter determination subsystem for determining values for said plurality of variable parameters of said servo control unit, said servo parameter determination subsystem including means for implementing a genetic optimization process within said disk drive to adaptively determine parameter values using an iterative process of data manipulation,
wherein said servo control unit includes a servo control loop for use in performing seek operations within said disk drive, said servo control loop including a first input for receiving seek control values, wherein said servo parameter determination subsystem is operative for determining seek control values for delivery to said input.

17. The disk drive, as claimed in claim 16, wherein:
said servo parameter determination subsystem includes means for monitoring servo performance within said disk drive and means for initiating a genetic optimization procedure when servo performance drops below a predetermined level.

18. The disk drive, as claimed in claim 16, wherein:
said means for implementing a genetic optimization process includes means for determining fitness values for individual parameter value combinations and means for selecting parameter value combinations for reproduction based on said fitness values.

19. A method for tuning servo parameters for use in a seek servo control system within a disk drive, said method comprising the steps of:
providing a disk drive;
determining a first set of servo parameter values for said disk drive using a genetic optimization process, said first set of servo parameter values for use in performing seek operations within a first radial region on a disk surface within said disk drive;
storing said first set of servo parameter values within a memory of said disk drive;
determining a second set of servo parameter values for said disk drive using said genetic optimization process, said second set of servo parameter values for use in performing seek operations within a second radial region on said disk surface, wherein said second radial region is different from said first radial region; and
storing said second set of servo parameter values within said memory of said disk drive.

20. The method claimed in claim 19, further comprising:
determining other sets of servo parameter values for said disk drive using said genetic optimization process, said other sets of servo parameter values for use in performing seek operations within other radial regions on said disk surface, wherein said other radial regions are different from said first and second radial regions; and
storing said other sets of servo parameter values within said memory of said disk drive.

21. The method claimed in claim 19, wherein:
said step of determining a first set of servo parameter values includes generating a position mode table for use during a position mode seek operation.

22. The method claimed in claim 19, wherein said genetic optimization process includes:
generating an initial population of individuals, each of said individuals in said initial population including a plurality of servo parameter values;
determining a fitness value for each individual in said initial population of individuals;
generating a second population of individuals using said initial population of individuals and corresponding fitness values; and
determining a fitness value for each individual in said second population of individuals.

23. The method claimed in claim 22, wherein:
said step of generating a second population of individuals includes selecting individuals from said first population of individuals based on corresponding fitness values and performing genetic operations on said selected individuals.

24. The method claimed in claim 22, further comprising the step of selecting an individual having an optimal fitness value.

25. A method for tuning seek servo parameters of a disk drive, the method comprising the steps of:
providing a disk drive having a plurality of seek servo parameters; and
tuning said seek servo parameters using a genetic process.

26. The method of claim 25, wherein at least one of the plurality of seek servo parameters is a feed forward parameter.

27. The method of claim 25, wherein at least one of the plurality of seek servo parameter values is a position-to-go parameter.

28. A method comprising the steps of:

providing a disk drive having position mode tables for performing position mode seek operations, said position mode tables including adjustable parameters; and, tuning said adjustable parameters using a genetic process.

29. The method of claim 28, wherein at least one of the adjustable parameters is a feed forward parameter.

30. The method of claim 30, wherein at least one of the adjustable parameters is a position-to-go parameter.

* * * * *